Nov. 9, 1971  D. B. VINCENT  3,618,299
GAS CLEANING APPARATUS
Filed April 1, 1969  2 Sheets-Sheet 1

INVENTOR
DANIEL B. VINCENT
BY Cushman, Darby & Cushman
ATTORNEYS

United States Patent Office 3,618,299
Patented Nov. 9, 1971

3,618,299
GAS CLEANING APPARATUS
Daniel B. Vincent, 2608 Watrous Ave.,
Tampa, Fla. 33609
Filed Apr. 1, 1969, Ser. No. 812,467
Int. Cl. B01d 47/06
U.S. Cl. 55—236
4 Claims

ABSTRACT OF THE DISCLOSURE

Exhaust gases containing entrained particles are led centrifugally, and downwardly in a cylindrical vessel provided with a liquid spray. Passing out of the lower end of the first vessel, the gases travel up the annulus between that vessel and a larger cylindrical vessel. The annulus is provided with frusto-conical baffles wet by liquid sprays and serve to change direction of gas flow and to throw liquid with entrained particles toward the inner and outer walls of the annulus where falling films result. The liquid for the upper few baffles is preferably water and for the lower baffles, thin liquor. Two adjacent intermediate baffles extend to the respective sidewalls for draining the fresh water washing zone.

BACKGROUND OF THE INVENTION

Exhaust gases from direct heat dryers carry an appreciable amount of very fine particles and odorous gases that are obnoxious and objectionable, especially when emitted into populous areas. These particles can result from the product that is being dried. They are also produced by unburned fuel in the dryer furnace or by some of the material being scorched or burned in the dryer.

In the flash evaporator which is the subject of my U.S. Pat. No. 2,684,713, tiny particles of the syrup being concentrated tend to build up a layer or film of syrup on the inner wall when standard cyclone-type separators are used; and progressively climb the inner wall of the exhaust stack as an increasingly thicker film. When the liquid film reaches the top of the stack, large droplets of syrup build up and are thrown away, landing on roofs of nearby buildings and cars parked nearby.

Both of the above problems have been partially overcome—the first by using dry separation cyclone separators of special design, and the second by using wash towers using large quantities of spray water to entrain the droplets and discharge the syrup-laden low Brix waters to sewers.

The dry cyclone types, while separating out most of the fine dust, are still a nuisance when applied to a plant operating continuously and drying large quantities of material continuously, for while the percentage hourly separation is good, total daily quantities of dried material deposited all over the neighborhood is still the source of objections. The spray tower type cannot be used where stream pollution laws prevent dumping of waste liquors.

SUMMARY OF THE INVENTION

To overcome the above difficulties I have developed a separator employing unique features as described below with reference to the drawings. In the device of the invention, exhaust gases containing entrained particles are led centrifugally, and downwardly in a cylindrical vessel provided with a liquid spray. Passing out of the lower end of the first vessel, the gases travel up the annulus between that vessel and a larger cylindrical vessel. The annulus is provided with frusto-conical baffles wet by liquid sprays and serve to change direction of gas flow and to throw liquid with entrained particles toward the inner and outer walls of the annulus where falling films result. The liquid for the upper few baffles is preferably water and for the lower baffles, thin liquor. Two adjacent intermediate baffles extend to the respective sidewalls for draining the fresh water washing zone.

It should be understood that the invention has as objects the clearing of exhaust gases of soluble and insoluble substances using process water to entrain or dissolve the particulate matter; and the reduction of back pressure against gases being scrubbed by using centrifugal force, change of direction of the gases and wetting or dissolving the particulate matter in a film of liquor on a plate. This requires much less water than the spray method of wetting. Further clearing is provided by dissolving with clean water final traces of particulate matter to bring the liquor up to process water strength, then sending the liquor to the process water tank. By these steps no wash waters need be dumped.

The principles of the invention will be further hereinafter discussed with reference to the drawing wherein a preferred embodiment is shown. The specifics illustrated in the drawing are intended to exemplify rather than limit, aspects of the invention as defined in the claims.

DESCRIPTION OF THE PREFERRED EMBODIMENT

Figure 1:
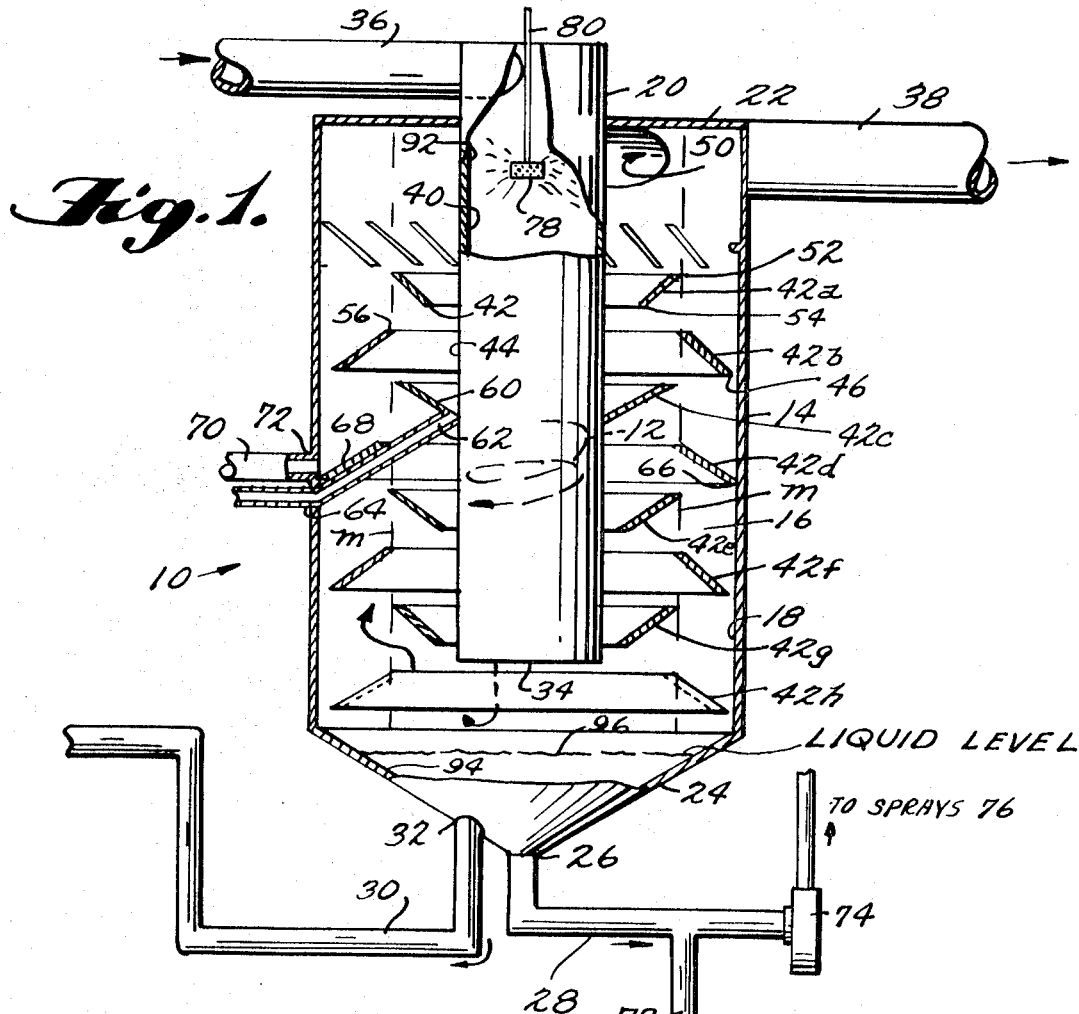
FIG. 1 is a longitudinal sectional view of apparatus in accordance with the principles of the invention.
Figure 2:
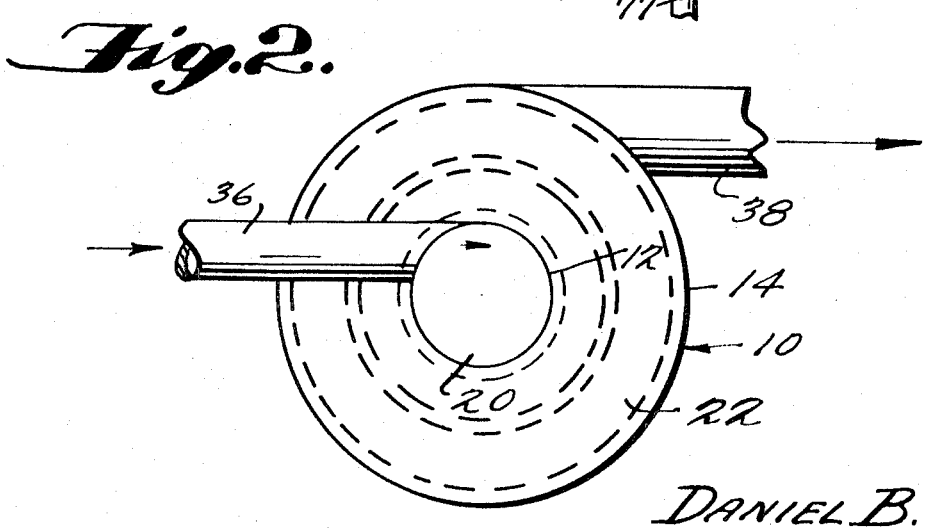
FIG. 2 is a top plan view of the device of FIG. 1.

As shown in FIG. 1, the device 10 includes a vertically disposed tubular cylindrical vessel 12 axially centrally disposed within a vertically disposed cylindrical tubular vessel 14. The vessel 14 is of larger diameter than the vessel 12 so that an annulus 16 is defined between the exterior of the vessel 12 and the interior of the vessel 14 sidewall 18. The vessel 14 is closed about the protruding upper end 20 of the vessel 12 by an annular top wall 22. The bottom wall 24 of the vessel 14 preferably tapers downwardly to the intake 26 of an outlet pipe 28. An overflow pipe 30 may also be communicated to the bottom of the vessel 14 at 32 through the bottom wall 24.

As shown, the vessel 12 has an open lower end 34 spaced above the bottom wall 24 of the vessel 14. At its upper end, the vessel 12 is provided with a tangential inlet pipe 36. Likewise, the vessel 14 is provided at its upper end with a tangential outlet pipe 38 having the same sense as the inlet pipe 36. Accordingly, there is provided a gas flow path which proceeds through the inlet pipe 36 tangentially into the throughbore 40 of the vessel 12, down the throughbore 40, out the lower end 34, up the annulus 16 and out the tangential outlet pipe 38. The inlet pipe 36 may be provided with a blower and/or the outlet pipe 38 may be provided with an exhaust fan in order to maintain the desired gas flow through the system.

Further in accordance with the invention, the annulus 16 is provided with a plurality of axially spaced baffles 42 for increasing the length of path of gas travel through the device, increasing gas/liquid contact within the device and for deflecting liquid containing material washed from the gas into contact with the interior surface 46 of the vessel 14 sidewall 18 and the exterior surface 44 of the vessel 12 within the vessel 14.

Figure 3:
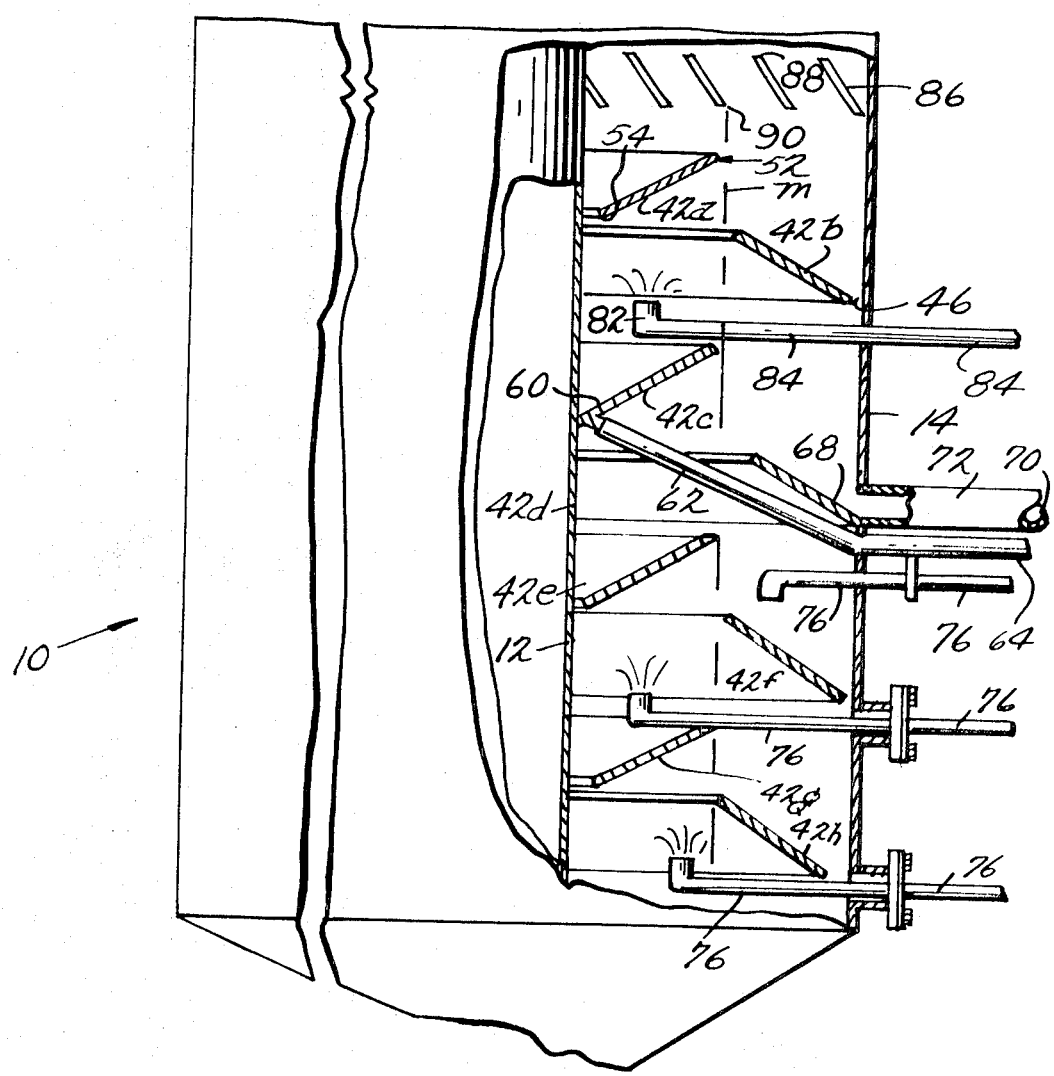
FIG. 3 is an enlarged fragmentary longitudinal sectional view of the device of FIG. 1.

In FIGS. 1 and 3, the several baffles indicated by the numerals 42 have been provided with subscripts a through h in order to facilitate description of the individual baffles.

In the preferred embodiment, the baffles 42 have the form of tubular frusto cones coaxially disposed about the vessel 12 so that alternate ones taper in an opposite sense. The uppermost baffle $42_a$ is spaced below the tangential intake 50 of the outlet pipe 38 and the lowermost baffle, $42_h$, is shown spaced between the lower end 34 of the vessel 12 and the lower end of the sidewall 18 of the vessel 14.

In the preferred embodiment, the uppermost baffle $42_a$ enlarges in diameter as it proceeds upwardly to an upper end edge 52 having a diameter lying on the imaginary tubular midpoint plane $m$ of the annulus 16. The lower, inner edge 54 of the baffle $42_a$ is spaced a short distance from the exterior 44 of the vessel 12. The upper, inner edge 56 of the downwardly enlarging baffle $42_b$ lies vertically beneath the baffle $42_a$ edge 52 in the plane $m$. The radially outer, axially lower edge of the baffle $42_b$ is spaced a short distance from the interior 46 of the sidewall 18 of the vessel 14. The baffle $42_c$ is similar to the baffle $42_a$ as described excepting that its diameter continues to decrease, proceedingly axially downwardly, until the baffle $42_c$ circumferentially engages the exterior 44 of the vessel 12 to provide a trough 60. A drainpipe 62 communicates the root of the trough 60 with the exterior of the device 10 by passing through the sidewall 18 of the vessel 14 at 64. The baffle $42_d$ is similar to the baffle $42_b$ as described above except that the baffle $42_d$ continues to increase in diameter as it proceeds downwardly until the lower end edge 66 thereof circumferentially engages the interior 46 of the sidewall 18 of the vessel 14 to provide a trough 68. A drainpipe 70 communicates through the vessel 14 sidewall 18 at 72 with the root of the trough 68 to provide an outlet therefor. The baffles $42_e$ and $42_g$ are similar to the baffle $42_a$ as described above. The baffles $42_f$ and $42_h$ are similar to the baffle $42_b$ as described above.

All of the baffles 42 may be fabricated of sheet metal, such as stainless steel.

The outlet pipe 28 is provided with a circulating pump 74 for forwarding liquid which drains from the vessel 14 at 26 to a plurality of spray heads 76 positioned within the annulus 16 below the baffle $42_d$ and arrange to spray against the upper and lower sides of the baffles $42_e$, $42_f$, $42_g$, and $42_h$ and the underside of the baffle $42_e$. Make-up liquid for this spray head system may be introduced to the pipe line 28, for instance via the inlet pipe 77 shown located upstream of the circulating pump 74. Where the device 10 is used as a gas cleaning system for a liquid evaporator, inbound thin liquor being concentrated may be used as the make-up liquid introduced into the gas washing system at 76.

The device 10 further includes a spray head 78 coaxially disposed in the throughbore of the vessel 12 near its upper end but below the tangential inlet of the inlet pipe 36 and designed to provide a generally radially outwardly directed liquid spray. The spray head 78 is supplied with spray liquid through a supply pipe 80. This spray liquid may be process water condensate from, another part of the plant, fresh water or the like. A plurality of spray heads 82 are provided within the annulus 16, above the baffle $42_d$ for spraying liquid onto the surfaces of the baffles $42_a$, $42_b$, $42_c$ and the upper surface of the baffle $42_d$. The spray liquid for the spray heads 82 is preferably fresh water provided through respective pipes 84.

Axially between the upper edge 52 of the baffle $42_a$ and the lower extent of the intake 50 of the outlet pipe 38, a plurality of angularly spaced, radially inwardly projecting plates 86 are each obliquely mounted on the interior 46 of the sidewall 18 of the vessel 14. The partial helixes formed by the plates 86 have a sense opposite to the sense of tangential flow provided by the inlet and outlet pipes 36 and 38. Preferably, the plates 86 are tipped at an angle of about 15° from the horizontal and the upper end 88 of each plate overlies the lower end 90 of an adjacent plate. The object of the provision of the plates 86 is to prevent liquid film on the interior surface 46 of the sidewall 18 from crawling further up said sidewall than the level of said plates 86.

OPERATION OF THE PREFERRED EMBODIMENT

During operation of the device 10 as described above, exhaust gases or other gases to be cleaned, enter the throughbore 40 of the vessel 12 in a centrifugal manner via a tangential inlet pipe 36. In the present example, wherein specific values are given for the purpose of illustration, the vessel 12 is 10 feet in height and 3 feet in internal diameter. The vessel 14 is about 6 feet in internal diameter. An annular space about 1 inch in width is provided between the exterior of the vessel 12 and the inner, lower edges of the respective baffles $42_a$, $42_e$ and $42_g$. Similarly, an annular space of about 1 inch across is provided between the interior 46 of the sidewall 18 and the outer, lower edge of each of the baffles $42_b$, $42_f$ and $42_h$. The gases enter the throughbore 40 at high velocity, for instance 2,500 feet per minute, and are thoroughly wetted with a heavy spray of liquid from the spray head 78, for instance at a rate of 100 gallons per minute to 20,000 cu. feet per minute of inbound dirty exhaust gases. The centrifugal force imparted to the stream forces most of the spray liquid and entrained solids to the internal surface 92 of the vessel 12. The liquid and entrained solids fall under the influence of gravity down the surface 92 to the bottom region 94 of the vessel 14. The overflow pipe 30 and circulation loop 28 are so constructed that the liquid level 96 in the bottom region 94 remains below the lower extent of the baffle $42_h$.

The gases passing out of the lower end 34 of the vessel 12 turn through 180° still moving in a rapid centrifugal manner, and blow upwardly through the annulus 16 and out the outlet pipe 38. As the gas stream circulates around and passes up through the annulus 16, it warps rapidly in and out and into contact with the exterior 44 of the vessel 12 and the interior 46 of the vessel 14, the helical course of the gas stream being broken abruptly by the baffles 42. Each time this bending of the gas stream occurs, a portion of the entrained solids is thrown out of the gas stream and against the surfaces of the baffles 42. These baffles are kept continuously wet by streams of liquid sprayed upon them from the spray heads 76 and 82. As this liquid runs off the lower sides of the inner, upwardly flaring baffles, it is carried and forced by the rapid flow of gases against the inner, lower surfaces of the adjacent, opposing baffles, forming complete liquid films on the surfaces against which the entrained particles from the gas stream impinge. This results in such particles being dissolved into the liquid or being wetted and captured by the liquid. The liquid films leave the upper, following edges of the baffles as sheets of liquid which are thrown to the surface 44 where liquid builds up and flows downwardly under the influence of gravity. As outlined above, some of this liquid is recycled from the reservoir 94 through the recirculation loop 28 with a makeup of inbound thin liquor at 77. The remainder of the liquid in the reservoir 94 exists from the device 10 via the overflow pipe 30 from where it may be pumped over a shaker screen (not shown) to remove any solid insoluble particles from it. The screened liquor may then be reintroduced to the bulk supply of thin liquor for concentrator input (continuing with the above assumption, for purposes of illustration that the device 10 is incorporated in an integrated concentration system as an exhaust gas washing means).

The liquid provided through the piping 84 to the spray heads 82 is preferably fresh water, to ensure entrainment and capture of the last traces of recoverable solids from the gas. The liquid draining from the baffles sprayed with fresh water by the spray heads 82 drains to the troughs 60 and 68 and flows from the device 10 through the outlet conduits 70 and 72. This liquid may be discarded or recirculated to the concentrator system, as desired.

When using the device 10 as described, not only are the exhaust gases washed substantially clean, but the entrained solids that would have been lost to the atmosphere are recovered and added back to the liquid being concentrated.

When using the device 10 to cleanse exhaust gases from a dryer containing dry, dusty particles, the effluent from the outlet pipes 30, 70 and 72 may be passed over a shaker screen and the tailing returned and mixed into the incoming wet material being fed to the dryer. In such an instance, the liquids used for wetting the baffles in the lower section of the device 10 may be returned to and mixed with the incoming material being dried, when the concentration of the liquors has reached a desired percentage. It may be noted, that if the dew point temperature of the dryer exhaust gases is below the dry bulb temperature of the exhaust gases, some evaporation will take place on the baffles within the annulus 16.

It should now be apparent that the apparatus for cleaning gas streams as described hereinabove possesses each of the attributes set forth in the specification under the heading "Summary of the Invention" hereinbefore. Because the apparatus of the invention can be modified to some extent without departing from the principles of the invention as they have been outlined and explained in this specification, the present invention should be understood as encompassing all such modifications as are within the spirit and scope of the following claims.

What is claimed is:

1. Apparatus for cleaning gas streams containing entrained particles, comprising: a first cylindrical vessel of smaller diameter; a second cylindrical vessel of larger diameter; said first vessel extending within said second vessel with the longitudinal axes of said first and second vessels aligned, thereby providing an annulus between the vessels; means closing both ends of said second vessel; pipe means defining a tangential gas stream inlet for said first vessel near one end thereof; said first vessel having an open opposite end disposed within said second vessel; pipe means defining a tangential gas stream outlet for said second vessel having the same angular sense as said tangential gas stream inlet, and located toward said first vessel inlet pipe means opposite from said first vessel open other end, thereby providing a gas stream flow path which proceeds tangentially into said first vessel, along through said first vessel to and out of said open other end, back along said annulus and out said second vessel outlet pipe means; spray head means coaxially disposed within said first vessel adjacent said tangential gas stream inlet and disposed to provide a radially outwardly directed liquid spray; and conduit means connected to the spray head means within the first vessel for supplying liquid thereto for spraying, thereby wetting the first vessel interiorly thereof, wetting the gas stream and forcing particles therefrom into contact with the wetted first vessel; a plurality of baffles disposed within said annulus and arranged to deflect said gas stream radially inwardly and radially outwardly; said baffles comprising an axially spaced series of truncated tubular cones of which alternate ones taper in opposite senses, the baffles each circuiting said first vessel; each baffle which tapers toward said first vessel open other end having a radial outer extent substantially axially aligned with the radially inner extents of the baffles which taper toward said first vessel one end, to respectively provide inner baffles and outer baffles; one outer baffle intermediate said series extending radially outwardly into circumferential engagement with said second vessel to provide a first liquid catching trap; the inner baffle of said series located adjacent said one outer baffle toward said first vessel one end extending radially inwardly into circumferential engagement with said first vessel to provide a second liquid catching trap; a plurality of spray heads disposed within said annulus to spray against said baffles; means for supplying said spray heads with liquid for spraying onto said baffles, including first piping means connected to those of said spray heads which are disposed within said annulus between said tangential gas stream outlet and said liquid catching traps, and second piping means connected to those of said spray heads which are disposed within said annulus between said liquid catching traps and said drainpipe; whereby a gas stream proceeding along said annulus impinges upon said baffles and loses particles therefrom to said liquid; and outlet pipe means for draining said liquid and lost particles from said second vessel and including a drainpipe having an inlet to said second vessel located axially beyond said first vessel open other end; said outlet pipe means for draining liquid and lost particles from said second vessel further including conduits leading from said first and second liquid catching traps to outside said second vessel, whereby two different washing liquids may be used for successively washing the gas stream, effluent from one being collected via said conduits leading from the first and second liquid catching traps and effluent from the other being collected via said drainpipe.

2. The apparatus of claim 1 further including a plurality of angularly spaced radially inwardly extending plates mounted obliquely in said annulus on said second vessel, axially between said tangential gas stream outlet and said baffles; said plates approximating angularly short helixes having a sense opposite to that of said tangential gas stream inlet and said tangential gas stream outlet, for preventing further movement of liquid along said second vessel toward said tangential gas outlet.

3. The apparatus of claim 1 further including a liquid circulating pump having an intake side and an outlet side; said drainpipe being connected to said liquid circulating pump inlet side and said second piping means being connected to said liquid circulating pump outlet side for recirculating drained liquid to the spray heads supplied by said second piping means, and thus defining a recirculation loop including said drainpipe, said liquid circulating pump and said second piping means.

4. The apparatus of claim 3, the outlet pipe means for draining said liquid and lost particles from said second vessel further including overflow pipe means communicated to said second vessel axially beyond said first vessel open other end for removing a portion of the drained liquid from said apparatus; and a make-up liquid introduction pipe communicated to said recirculation loop for replacing drained liquid removed from said apparatus via said overflow pipe means.

References Cited

UNITED STATES PATENTS

| 1,169,764 | 2/1916 | Brassert | 55—223 |
| 1,388,813 | 8/1921 | Geesman | 261—111 |
| 1,952,308 | 3/1934 | Bower | 55—236 |
| 1,999,589 | 4/1935 | Frey | 55—238 |
| 2,259,031 | 10/1941 | Fisher | 55—238 |
| 2,585,440 | 2/1952 | Collins | 261—111 |

FOREIGN PATENTS

| 23,921 | 1910 | Great Britain. |
| 461,180 | 2/1937 | Great Britain. |

FRANK W. LUTTER, Primary Examiner

B. NOZICK, Assistant Examiner

U.S. Cl. X.R.

55—238, 257, 260, 446, 459; 261—79 A